United States Patent
Rogers et al.

(10) Patent No.: US 7,157,879 B2
(45) Date of Patent: Jan. 2, 2007

(54) ON-HARDWARE OPTIMIZATION OF STEPPER-MOTOR SYSTEM PERFORMANCE

(75) Inventors: John R. Rogers, Troy, NY (US); Kevin Craig, Saratoga Springs, NY (US)

(73) Assignee: Rensselaer Polytechnic Institute, Troy, NY (US)

(*) Notice: Subject to any disclaimer, the term of this patent is extended or adjusted under 35 U.S.C. 154(b) by 0 days.

(21) Appl. No.: 10/768,937

(22) Filed: Jan. 30, 2004

(65) Prior Publication Data

US 2004/0257026 A1 Dec. 23, 2004

Related U.S. Application Data

(60) Provisional application No. 60/443,679, filed on Jan. 30, 2003.

(51) Int. Cl.
*H02P 8/00* (2006.01)
(52) U.S. Cl. .................. 318/696; 318/685; 318/439; 318/138
(58) Field of Classification Search .............. 318/138, 318/254, 439, 700–800, 685, 696, 560–650
See application file for complete search history.

(56) References Cited

U.S. PATENT DOCUMENTS

| | | | | |
|---|---|---|---|---|
| 4,147,968 | A * | 4/1979 | Goble | 318/685 |
| 4,535,405 | A * | 8/1985 | Hill et al. | 700/90 |
| 4,591,774 | A * | 5/1986 | Ferris et al. | 318/696 |
| 4,631,657 | A * | 12/1986 | Hill et al. | 700/63 |
| 4,683,409 | A * | 7/1987 | Boillat | 318/696 |
| 4,761,598 | A * | 8/1988 | Lovrenich | 318/685 |
| 5,032,780 | A * | 7/1991 | Hopkins | 318/696 |
| 5,216,345 | A * | 6/1993 | Eyerly | 318/685 |
| 5,334,920 | A * | 8/1994 | Ito et al. | 318/685 |
| 5,793,177 | A * | 8/1998 | Chia | 318/685 |
| 6,476,578 | B1 * | 11/2002 | Yoshikawa et al. | 318/685 |
| 6,747,434 | B1 * | 6/2004 | Pigott et al. | 318/696 |

* cited by examiner

*Primary Examiner*—Lincoln Donovan
*Assistant Examiner*—Tyrone Smith
(74) *Attorney, Agent, or Firm*—Notaro & Michalos P.C.

(57) ABSTRACT

Apparatus for optimizing performance of a stepper motor includes interaction between on-hardware system drivers and a host controlling computer through an intermediate target computer. The command instructions from the host computer are optimized by the interaction using an objective function to define the best performance of the stepper motor and real-time feedback from operation of the motor. A method for optimizing the stepper motor performance is also disclosed.

10 Claims, 10 Drawing Sheets

ON-HARDWARE OPTIMIZATION OF STEPPER-MOTOR SYSTEM PERFORMANCE

CROSS-REFERENCE TO RELATED APPLICATION

This application is a continuation of provisional U.S. patent application Ser. No. 60/443,679, filed Jan. 30, 2003, the entirety of which is hereby incorporated by reference.

FIELD AND BACKGROUND OF THE INVENTION

The present invention relates generally to the field of control systems and in particular to a new and useful controller for a stepper-motor.

Stepper-motors are ubiquitous in modern office equipment and other machinery, and yet little is published regarding their optimal use in open loop systems. Stepper motors are a good choice for open loop applications because the position error is not cumulative with rotation as long as synchroism is maintained.

Stepper-motors and control algorithms are disclosed for simulating the performance of particular operations. For example, Leenhouts, A. C., "Step Motor System Design Handbook, $2^{nd}$ Ed.". Litchfield Engineering Co.: Kingman, Ariz. (1997) identifies algorithms for generating stepper motor step sequences and optimizing these sequences based on simulation of the stepper motor system. And, in Robrecht, M. and J. Luckel, "A Model-Based Approach to Generating an Optimized Sequence for Stepping-Motor Systems," $7^{th}$ UK Mecahntronics Forum International Conference, Georgia Inst. of Tech., Atlanta, Ga. (2000) the step sequence is extracted from a closed loop stepper-driven system and applied in open loop mode.

Accurate control of a stepper-motor is limited by the ability of the control system to approximate the actual motor and subsequently provide the correct instructions for achieving the actual desired movement, with little or no error. That is, to move a motor to a specific position in a specific amount of time, and therefore at a certain velocity, is difficult due to variations between the motor and the model. The optimal solution may change depending on the desired optimized factor, such as minimizing residual vibration, producing a quick settling time or having an accurate position and velocity trajectory. While a solution can be found, finding the desired optimal performance solution for controlling a stepper-motor is difficult and time-consuming.

SUMMARY OF THE INVENTION

It is an object of the present invention to provide a method and apparatus for real-time optimization of a stepper-motor performance.

Accordingly, a control system for a stepper motor with real-time optimization is provided having computer-controlled interaction between optimization software and stepper-motor-driven system hardware. An interface or target computer mediates between a host computer sending control instructions and a hardware driver. The target computer interfaces between the optimizer and the hardware driver to provide the optimized step-time instructions to the motor. A step optimization model is loaded into the target computer for operating on the step-time sequence instructions to achieve an optimized step sequence based on an objective function.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
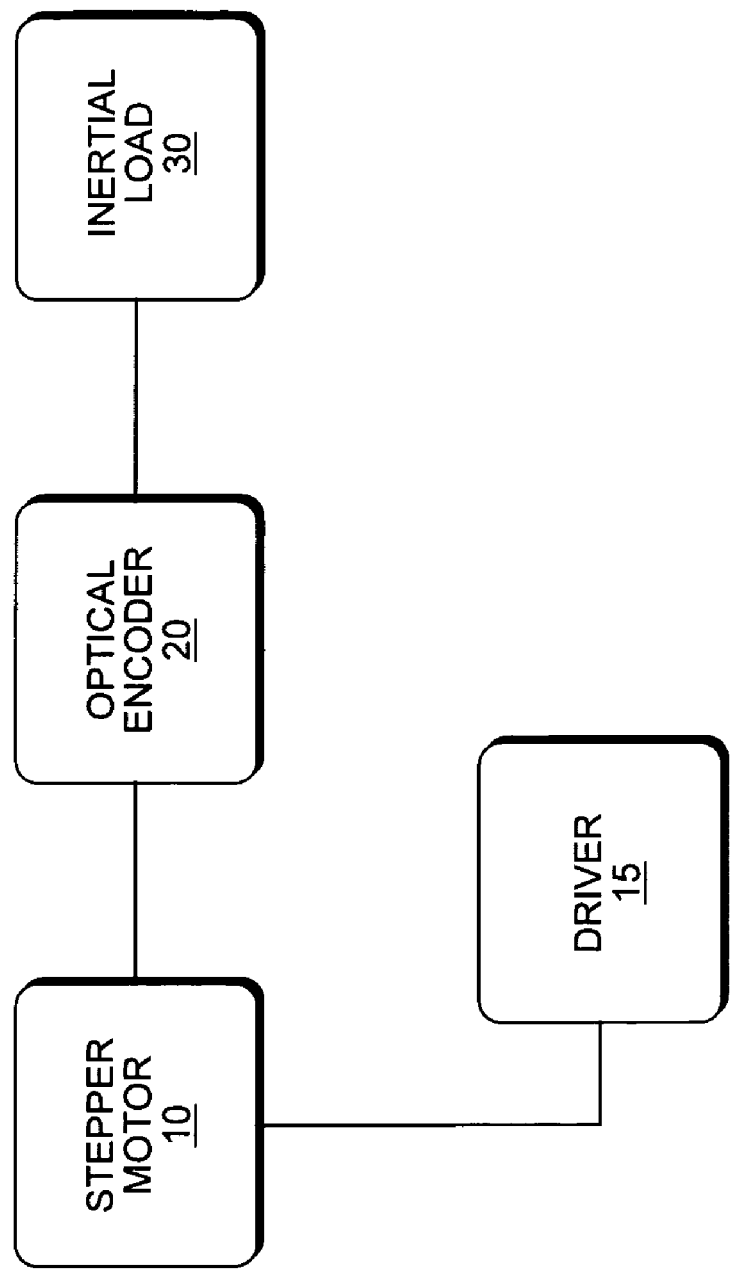
FIG. 1 is a schematic diagram of a stepper-motor test bed used with the invention.

Referring now to the drawings, in which like reference numerals are used to refer to the same or similar elements, FIG. 1 shows a diagram of a motor test bed used with the invention. The motor test bed has a stepper motor 10 connected with an optical encoder 20 for sensing position of the motor and an inertial load 30. A driver 15 is connected to the stepper motor 10 for operating the motor 10 in accordance with the invention.

Experiments using this configuration were conducted on a motor test bed to demonstrate on-hardware optimization. The test bed arrangement of FIG. 1 was constructed using a bipolar stepper motor 10 to drive a rigidly coupled rotational inertial load 30 of 1.00 lbf-in$^2$, and the position is sensed with a Hewlett-Packard HEDM-5505-J06 incremental optical encoder 20. The motor 10 used in the experimental test bed was a Minebea 17PM-K101-03V. The motor 10 was driven in the bipolar configuration using an Intelligent Motion Systems' IM483 driver 15 to operate the motor 15 in half step mode at 24 volts.

A. Overview

The control system design process begins with a definition of the motion task. One such task might be to advance the load 18° and stop; another task might be to ramp up to a constant speed to drive the print head of an office printer across the paper while it prints, then ramp down to a stop. The motion task is translated into a position versus time or velocity versus time profile.

The profile is translated into a stepping command sequence to drive the stepper motor 10. Stepper motors driven by step-and-direction type drivers require two logic-level command signals. The direction input to the driver 15 controls the clockwise or counterclockwise rotation of the motor 10. The step input causes the motor 10 to advance one step for each low-to-high transition. Thus the stepping command signal takes the form of a pulse train with as many pulses as steps needed for the desired motion.

Figure 4A:
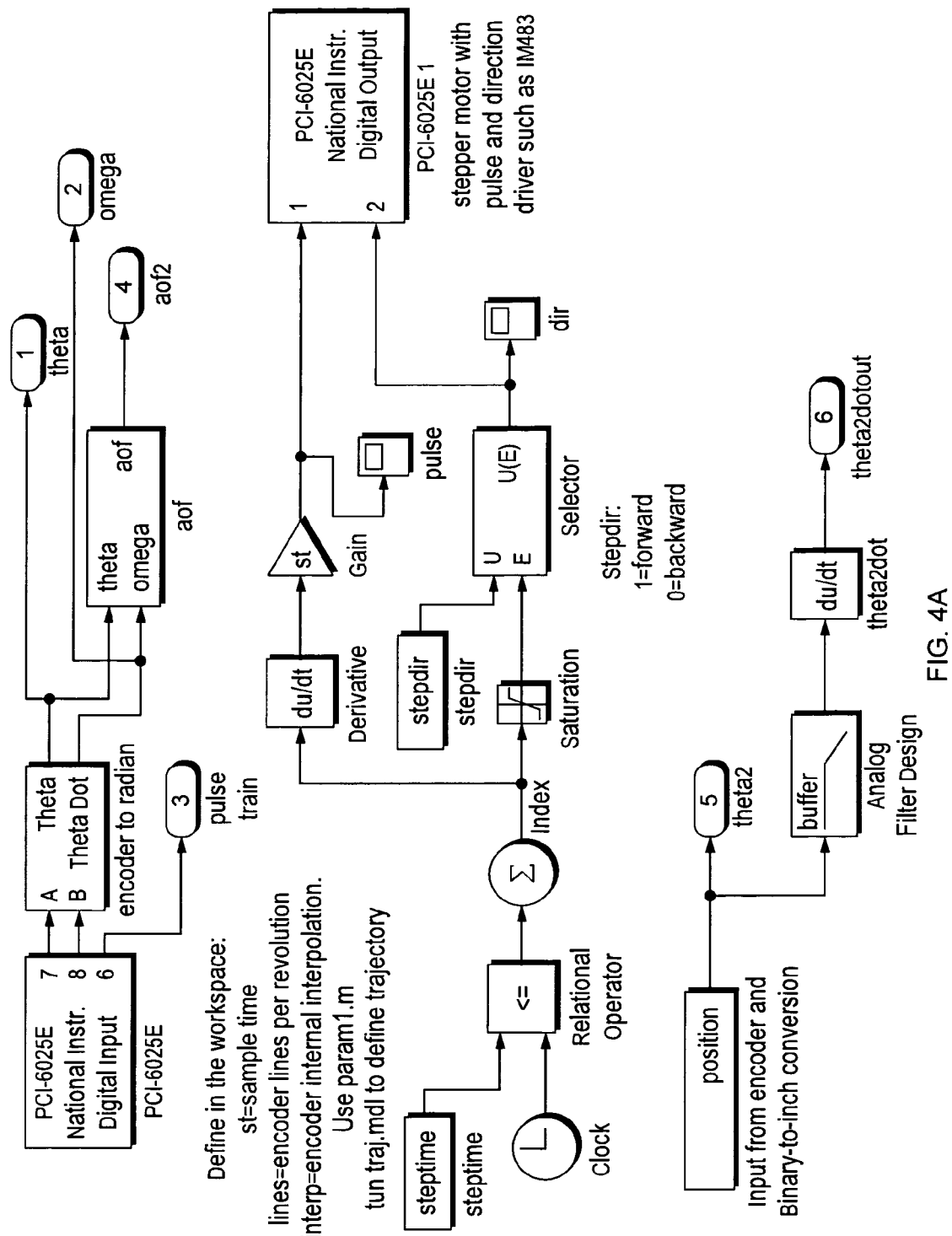
FIG. 4A is a diagram of a step motor trajectory generator Simulink model.
Figure 4B:
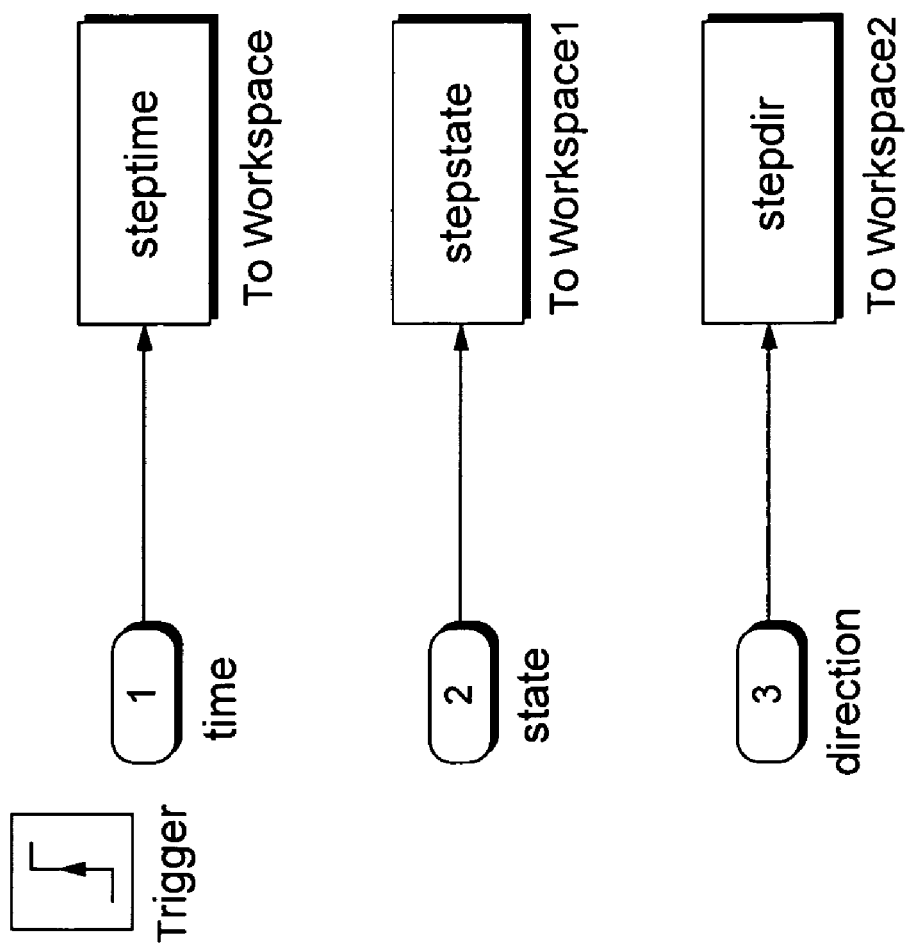
FIG. 4B is a diagram of a further portion of the Simulink model of FIG. 4A.
Figure 5A:
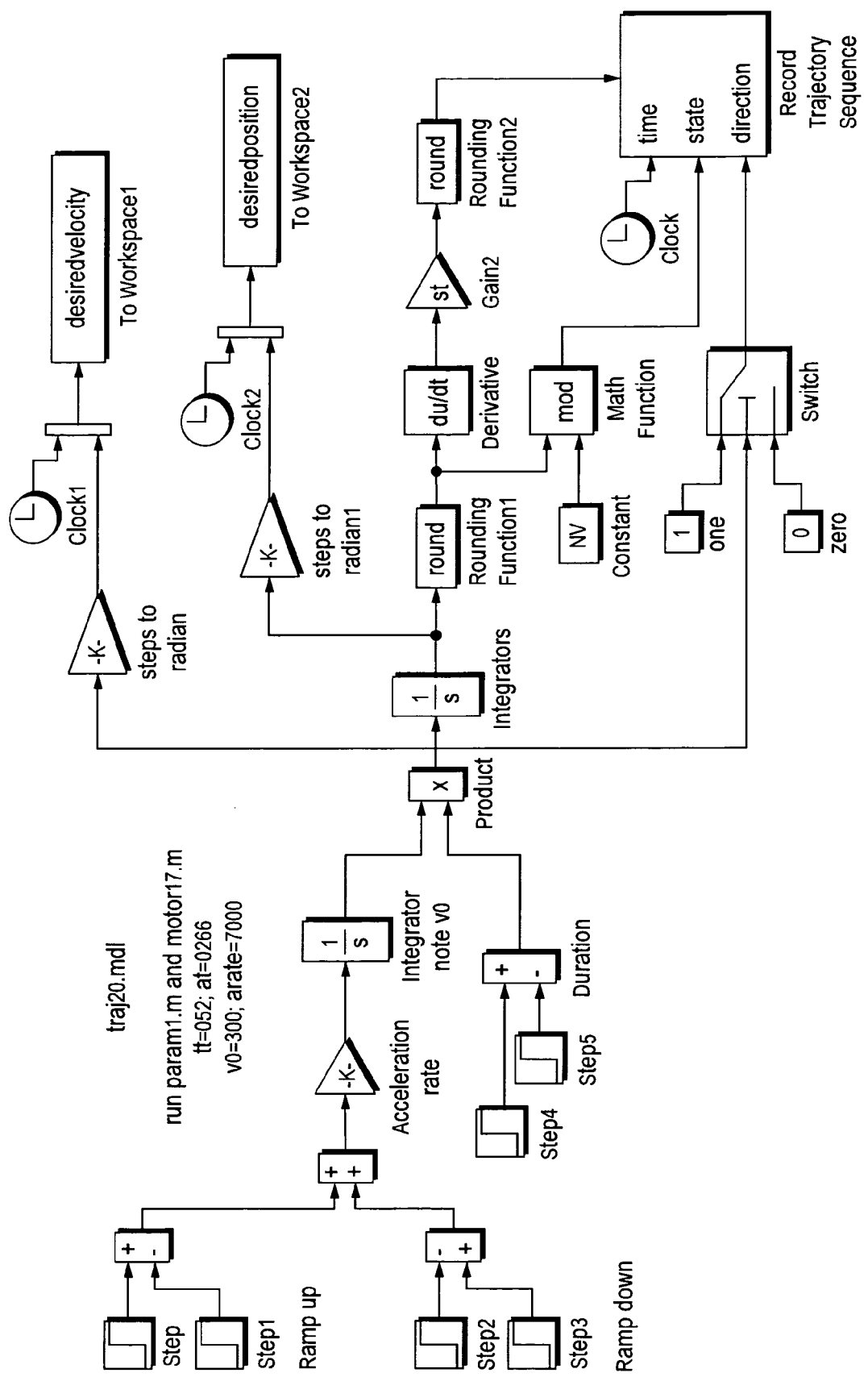
FIGS. 5A–5D are diagrams of components forming the step time optimization Simulink model used with the invention.
Figure 5B:
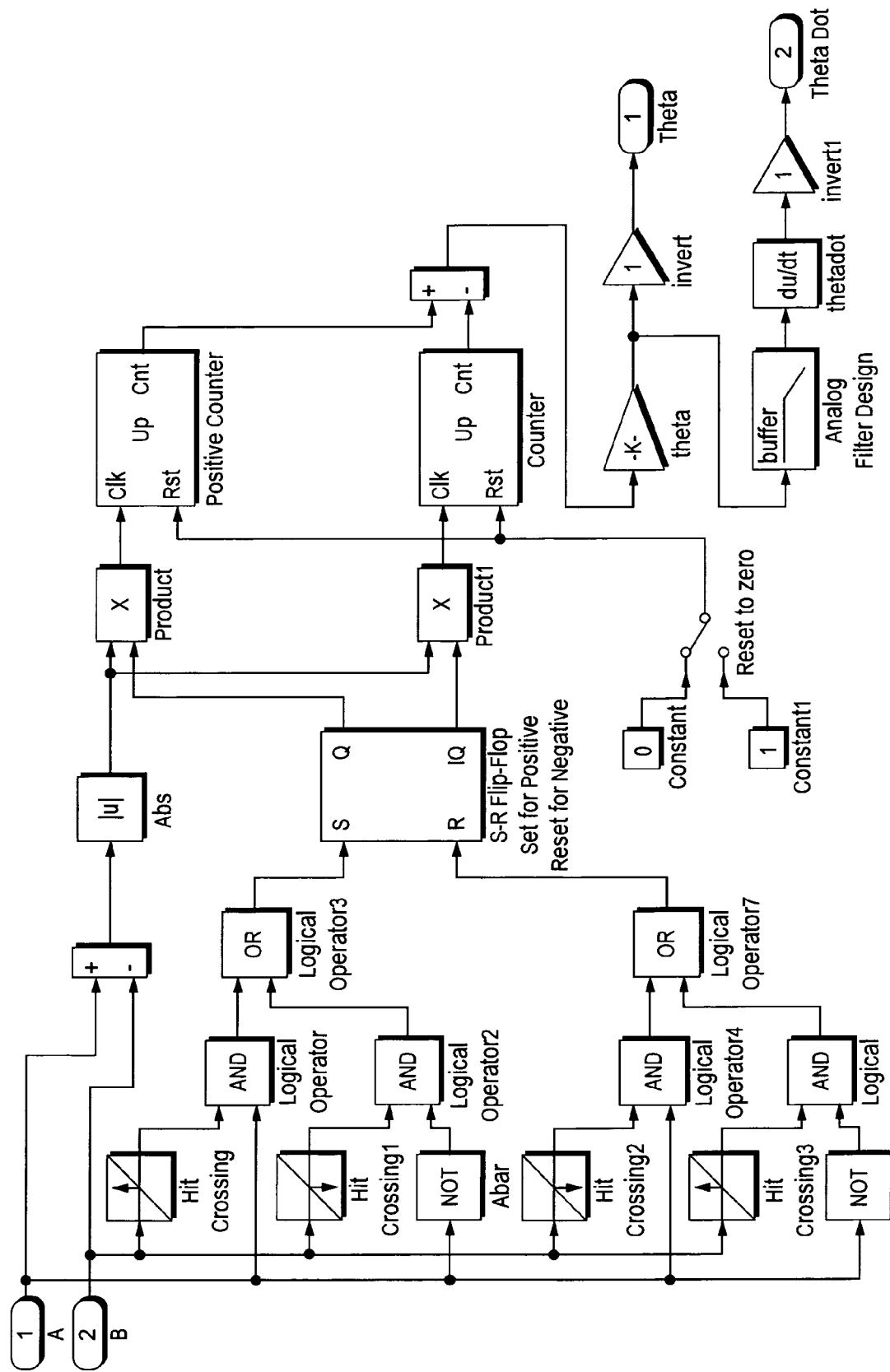
Figure 5C:
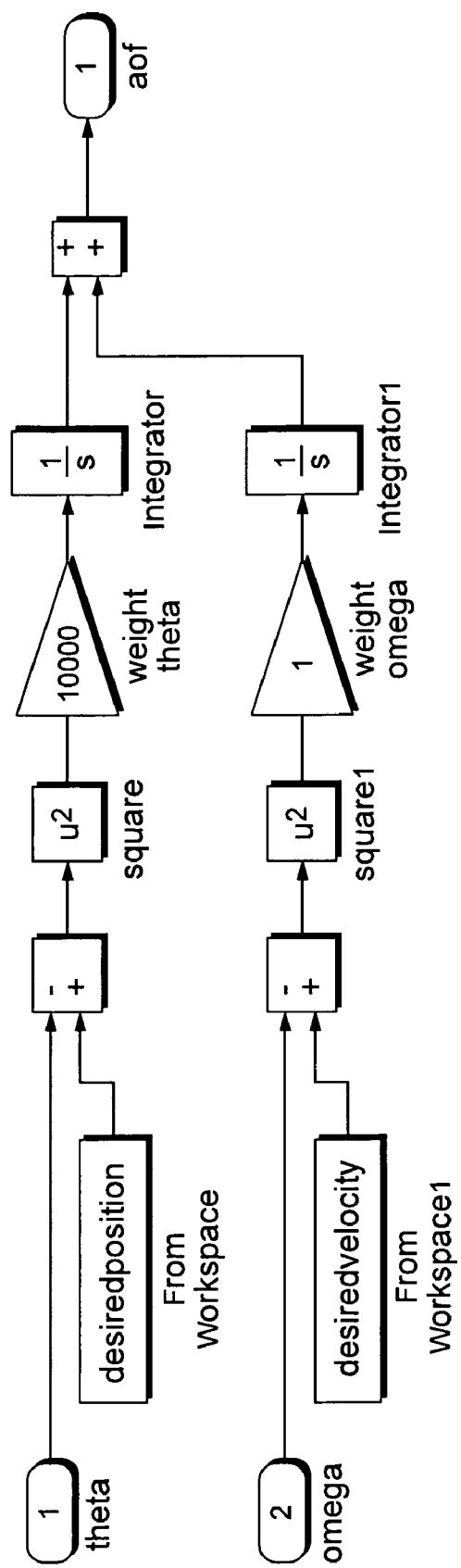
Figure 5D:
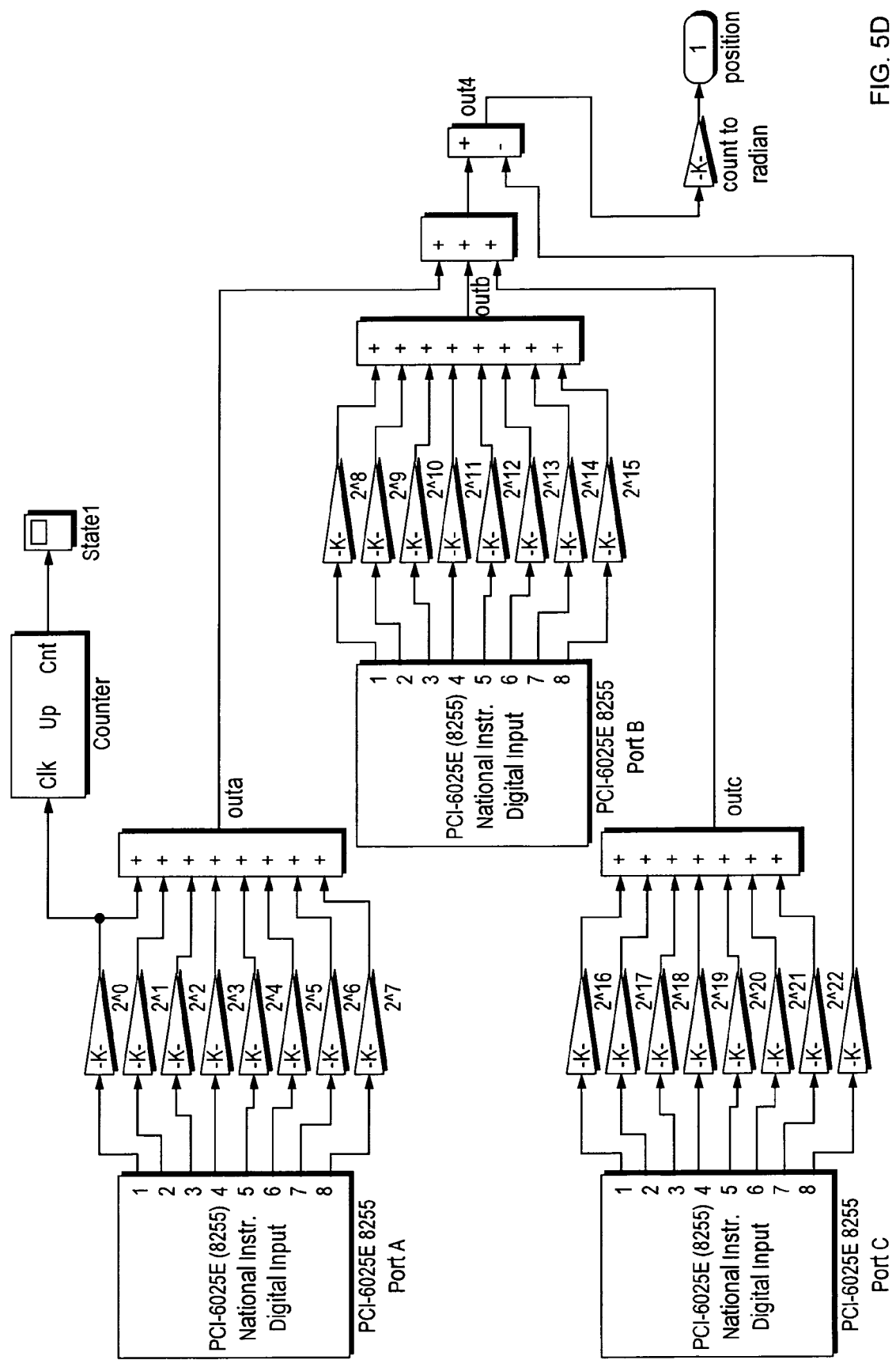

An initial stepping sequence is generated by the Matlab Simulink model, such as that shown in FIG. 4A. The additional model components of FIG. 4B may be included as well. The acceleration profile required to obtain the desired position and velocity profiles is defined in this Simulink model. Acceleration, in steps per second-squared, is integrated and added to initial velocity to obtain the desired motor rotational rate in steps per second. Velocity is integrated to obtain the desired position in steps.

The model, referred to as a trajectory model, records the time whenever the desired position advances by an angle equal to one step. The step time sequence so formed is a column matrix of the times at which to step the motor; it represents the input to the stepper motor open loop system. The goal of the optimization system herein is to refine this step time sequence to get the optimum response from the motor 10.

B. Computer Software

The system is programmed using Matlab script files ("*.m" files) and Simulink models. The script files load parameters into the workspace, and control the programming flow during the optimization. Matlab uses the FMINCON command from the Optimization Toolbox to perform the optimization. This command is referred to herein as the optimizer. XPC Target is used as the real time interlace with the physical system. XPC Target requires Matlab Real Time Workshop, and a C-compiler.

A total of five script files are used. They are: top1.m, top2.m, nonlcon3.m, param1.m and runtest.m. The software files used to control the system are as follows.

TOP1.M

```
%top1.m
%Real time interactive optimization
clear all
global sd t y tg stepindex nsto steptimeopt scale
steptime st
st=.0001;
param1
motor17
%xeroxscan
%trap4
sim('traj20') %to generate trajectory files stepdir
and steptime
%steptime=[0;steptime;tout (end)];
%stepdir=[stepdir(1);stepdir;stepdir(end)] ;
sd=tout (end); %duration of simulation
%proceed = input('Build Model stepopt2, then enter Y
to proceed', 's');
'Build Model stepopt2 and run top2'
```

TOP2.M

```
%top2.m
%Real time interactive optimization
global steptimeopt nsto stepindex steptime scale st
tolc
%set scale to control initial stepsize in optimization
direction
%use scale=1e-5 for .0001s, use 1e-6 for .001; use
2*1e-6 for .0005
scale=5*1e-6;
%options=optimset('Display', 'final', 'TolX',
.001*scale, 'TolFun', .2);
tolc=.00005*scale;
options=optimset ('Display', 'final', 'To lX',
.0004*scale, 'TolCon', tolc);
A= [ ];
B= [ ];
Aeq= [ ];
Beq= [ ];
Lb=[.001; .002; .003; .004);
UB=[sd-.004;sd-.003;sd-.002;sd-.001);
Lbs=Lb* scale
UBs=UB*scale;
nonlconempty=[ ];
steptimeopt=[ ];
nsto=5; %number of steps to optimize at a time
%stepindex=2;
for stepindex=16:nsto:length(steptime) ; %begin
optimizing at step 2. step 1 is always state=0, time=0
%for stepindex=2:nsto:6;
    stepindex
    %the following if statement governs the last
    iteration allowing the last steps
%to be optimized if they number less than nsto
if nsto+stepindex > length (steptime)
    nsto=length (steptime) –stepindex+1
    lastpass=1
end
steptimeopt (stepindex:stepindex+nsto-1, 1) = fmincon
('runtest', steptime (stepindex:stepindex + nsto-
1)*scale, A, B, Aeq, Beq, Lbs, UBs, 'nonlcon3',
options);
wk1write ('steprecord.wk1', steptimeopt/scale) ;
end
steptimeopt=steptimeopt/scale;
```

NONLCON3.M

```
%nonlcon file for nonlinear constraints
function [C, Ceq]= nonlcon3 (stimes)
global nsto stepindex steptimeopt scale
stime=stimes/scale;
% constrain step sequence to be monotonic with minimum
and maximum spacing
% compare the first step to the last optimized step
deltatmin=.001;
deltatmax=.007;
    if stepindex ==1
        TL=0; %Lower bound
    else
        TL=steptimeopt (stepindex-1)/scale; %Lower
    bound
    end
%C(1) is a lower limit on the first step being
optimized
C(1) = TL+deltatmin-stime(1) ;
%C(nsto+1) is an upper limit on the first step being
optimized
C(nsto+1) =stime(1) -TL-deltatmax;
if (nsto>1)
    for i=2: nsto
    %C(i) limits how close together any two steps
    may be
    C(i) =stime (i-1) -stime (i) +deltatmin;
    end
```

-continued

```
    for k=nsto+2:2*nsto
    %C(k) limits how far apart any two steps
    may be
    C(k)=stime (k-nsto)-stime (k-nsto-1) -
deltatmax;
    end
end
Ceq=[ ]; %no quality constraints
```

PARAM1.M

```
%param1.m
%clear all
%global st sd t y %tg
sd=inf; %simulation duration (stop time)
Ts=st;
%Gurley R135 encoder:
gurleylines=3600 % number of encoder counts per
revolution before quadrature
gurleyinterp=10 % encoder internal CPR multiplier
%HP HEDS-5645#I06 encoder:
lines=512
interp=1
%HP HEDS-5645#J06 encoder:
%lines=1024;;
%interp=1;
%Inkjet linear encoder:
%lines=150; % per inch
%interp=1;
%parameters for trapezoidal velocity profile
v0=300; % initial velocity, steps per second
%for traj48
%arate=5000; %acceleration rate, Hz/sec
%at=.05; %acceleration duration
%tt=.11; %total time
% for traj32
%arate=7000; %acceleration rate, Hz/sec
%at=.0286; %acceleration duration
%tt=.052; %total time
% for traj inkjet: 600 steps and reverse
%arate=8000;
%at=.0875;
%tt=.661;
%dwell=.1; %pause time at end of stroke
%settle=.1; %settling time at vmax before accumulating
objective function
% for traj20 20 steps
arate=7000;
at=.0286;
tt=.052;
```

RUNTEST.M

```
function [aof] =runtest (stimes)
%function [x, t, y] =runtest
global tg sd t y scale steptime stepindex nsto
steptimeopt st tolc
f=nonlcon3 (stimes)-tolc/scale;
aofc=0;
if sum(not(f<=0)) %AB check constraints.
    %not (f<0) .*f
    aofc=50; %penalty if constraints are not met
    'constraint not met' ;
    %else%AB
end %AB
stime=stimes/scale%scale back to time in seconds
%build step sequence:
%if sum(stime) > sum(steptime+.2) %GG
aof=1000
else%GG
steptime2= [ ] ;
%create a column of equal delta t values, equal to the
difference between the last
% of this set of steps to be optimized and the
corresponding unoptimized step
%stime(end)
% stepindex+nsto-1
%steptime(stepindex+nsto-1)
%(steptime(stepindex+nsto-1)-stime(end))
temp=ones(size(steptime))* (steptime (stepindex +
nsto-1)- stime (end));
steptime2=(steptime-temp); %Shift remainder of
%unoptimized trajectory by delta t
% overwrite unoptimized with optimized and current:
steptime2(1:stepindex+nsto-1)=[steptimeopt/scale;sti
me];
    %if steptime2/stepindex)<steptime2(stepindex-1)
    %AAA check for nonmonotonic
    %aof=1000
    %else %AAA
        look=.2;
        settletime=.1;
        n=10; %number of hardware runs to average
%tg.stoptime=stime (end) +look;
%tg.stoptime=.25;
tg.p7=steptime2; %update step sequence on real time
target
clf
i=1;
j=0;
while i<=n %AA
    tg.start; %start simulation running on real time
    target
    t0=clock; %record start time
        while etime(clock, t0) < tg.stoptime +
        settletime%sd %BB pause while simulation
        runs etime(clock, t0);
        end %BB
    if strcmp(tg.CPUoverload, 'none') %CC
%x = tg.StateLog;
y1 = tg.OutputLogi -
t = tg.TimeLog;
subplot (311)
plot(t, y1(:,3))
hold on
%axis([0 .3 0 1])
subplot (312)
plot(t, y1(:,2))
hold on
%axis([0 .3 -10 15])
subplot (313)
plot(t, y1(:,4))
%axis([0 .3 0 10])
hold on
    %if y1(end)>2.5 %DD
    %    i=9999
    %else %DD
        if i==1 %EE
        y = tg.OutputLog; %Record aggregate
        objective function from target
        else %EE;
        y = y + tg.OutputLog; %Record aggregate
        objective function from target
        end %EE
    %y(end,3)
    % aofi(i)=y(end) ;%
    %    end %DD
    i=i+1;
else %CC
    j=j+1
        if j==10 %FF
        'overload'
        i=200;
        y(end)=9999;
        end %FF
    end %CC
end %AA
y=y./n;
%aof=round(sum(aofi)/n*2)/2
%aof=sum(aofi)/n
% aof=round(y(end)*10)/10
```

-continued

```
%y(floor(stime(end)/st), 4) %aof at last step
% y(end) %aof at end of simulation
aof1=y(floor(steptime(end)/st) ,4)% up 'til last step
aof2=(y(end)-y(floor(steptime(end)/st), 4)) %consider
only ringing after %last step
aof=aof1+aof2*10+aofc; %weigh ringing *10
aof=round(aof*10)/10 %round to nearest 0.1
%t = tg.TimeLog; %Record time vector
%subplot(311)
%plot(t, y(:,1), 'r'),
%axis([0 .3 0 1])
% subplot (312)
%plot(t, y(:,2), 'r')
%axis([0 .3 -10 15])
%subplot(313)
%plot(t, y(:,4), 'r')
%axis([0 .3 0 10])
%end %AAA
end%GG
%end%AB
```

There are two Simulink models used in the embodiment described herein. The Simulink models are Traj20.mdl and Stepopt2.mdl. The models are illustrated in FIGS. 4A and B and FIGS. 5A–5D, respectively.

C. Structure of the Hardware-Software System

Figure 2:
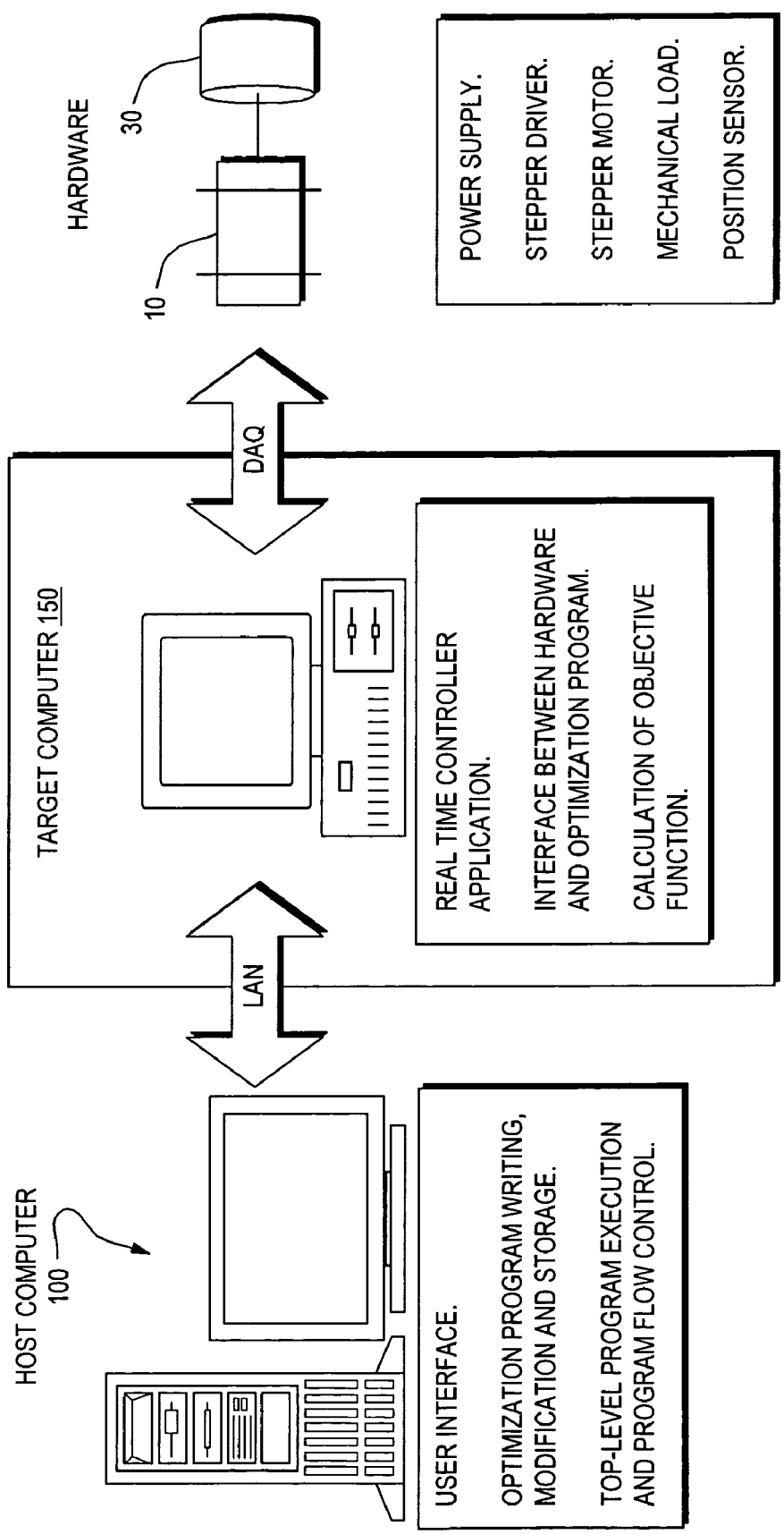
FIG. 2 is a diagram illustrating the interaction of the components of the control system.
Figure 3:
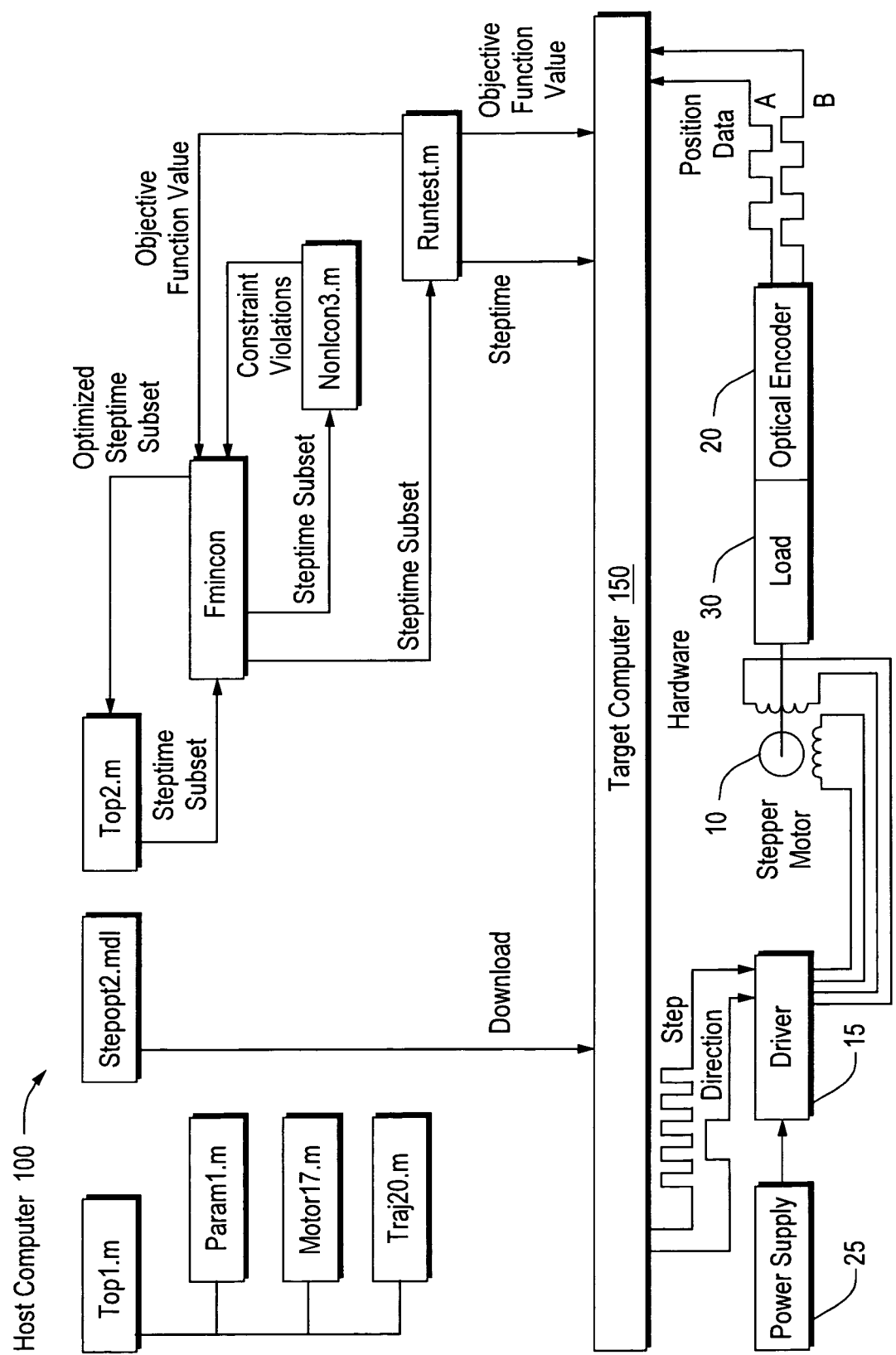
FIG. 3 is a diagram illustrating the programming hierarchy and information flow between the components of the control system.

The optimization is performed on a two-computer system. FIGS. 2 and 3 illustrate the system and operating components.

Referring to FIG. 2, the host computer 100 governs the optimization procedure and is the user interface for building and modifying models and other files. The target computer 150 with its data acquisition (DAQ) card serves as the interface between the optimizer and the physical system, including motor 10 and load 30. A control application, such as the Stepopt2.mdl model file, is downloaded from the host computer and runs in real time on the target computer 150. The functions of the real time application are to construct the command signals from the step time sequence, to pass the logic-level voltage command signals to the physical system, to record data from sensors, and to evaluate an objective function based on the system response.

FIG. 3 illustrates some of the connections between the hardware and target computer 150 in greater detail. As shown, step and direction instructions are received from target computer 150 by driver 15. Power supply 25 provides power to the hardware components through the driver 15, including the motor 10. Optical encoder 20 is mounted with load 30 to sense the position and trasmit that information back to the target computer 150 as real-time feedback. The feedback data is used by the optimization program on the target computer to refine and optimize the step-time sequence for the motor 10 in accordance with the objective function.

D. Optimization Procedure

As noted above, the optimization problem solved by the invention is to find the set of step time values that results in a position/velocity trajectory of the physical system that is closest to the desired trajectory. But, rather than finding the minimum of a mathematical objective function as in classical optimization, the "objective function" in this case is derived from the dynamic response of a physical system. The block diagram of the system shown in FIG. 3. best illustrates the optimization process.

In FIG. 3, three top-level commands are executed by the user: Top1.m, Stepopt2.mdl, and Top2.m. The Top1.m command loads the trajectory parameters, Param1.m, and the motor parameters Motor17.m. Then, the Top1.m command generates the initial step time sequence, as defined in the Simulink model Traj20.mdl. This step time sequence containing the desired number of steps is will serve as the starting guess at the solution to the optimization problem. The Simulink model Stepopt2.mdl is downloaded as a C program to the target computer. The Stepopt2.mdl program defines the objective function, and defines the input and output through the DAQ. The Top2.m script controls the program flow for the optimization.

The optimizer starts the application running on the target computer, which passes the command signal to the physical system. The target application records the system response from an optical encoder 20, calculates the value of the objective function, and reports this value to the optimizer. The optimizer checks the step time sequence against the constraints, checks the termination criteria, and uses a sequential quadratic programming (SQP) method to determine the next perturbation of the step time sequence. The optimizer controls the iterations, sending perturbed sequences to the target application, and interpreting the objective function.

E. The Objective Function

The objective function is a measure of how closely the physical system response matches the desired response. A low value of the objective function correlates with a good match. Thus we minimize the objective function to improve the dynamic performance of the system. The optimization variable is the step-time sequence. The time of each step is perturbed by the optimizer, and objective function is evaluated for each perturbation to measure the effect on the system response. The result is a step-time sequence that most nearly matches the desired angular position and angular velocity versus time.

The objective function used in the example herein is a weighted sum of position and velocity error squared, integrated over the duration of tile trajectory. It is defined in the Simulink model illustrated by FIGS. 5A–5D, and calculated within the optimization application that runs on the target computer. The position and velocity errors are first squared, and then weighted in a 10,000-to-1 ratio with theta carrying the higher weight. The weighted squared errors are integrated individually and then summed to obtain an aggregate objective function. Squaring the error gives greater weight to the function at the points that deviate most from the desired position and velocity. The weight ratio is used to bring the two components to the same order of magnitude.

The objective function is derived from the response of the physical system and therefore is subject to natural variations, even if the same step time sequence is executed. This situation is unlike calculating an objective function from a mathematical equation that, of course, is repeatable.

To account for the natural variation, the same step time sequence is executed on the hardware repeatedly, 10 times in the current example, and the objective function value reported is the average of the 10 individually compute objective function values. The reported objective function value is rounded to a number of significant figures to further increase its repeatability.

EXAMPLE

Figure 6A:
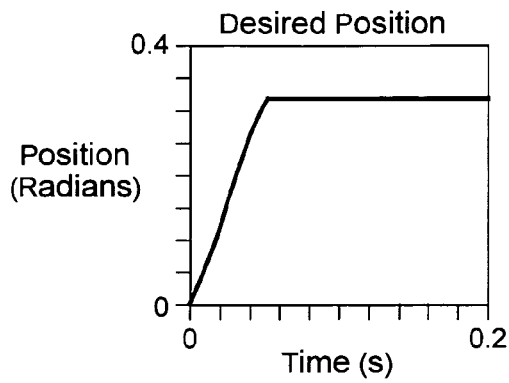
FIG. 6A is a graph plotting desired position against time for a control system optimized using the invention.
Figure 6B:
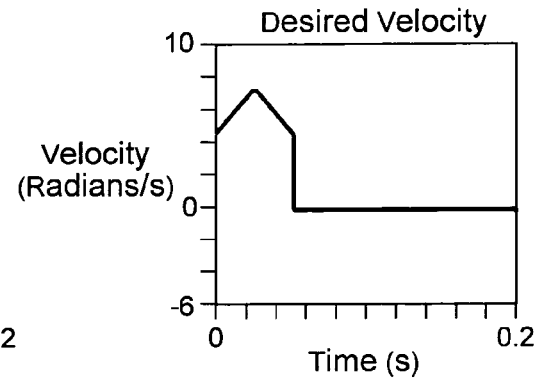
FIG. 6B is a graph plotting desired velocity against time used with the graph of FIG. 6A to defining a desired profile for test system.

The optimization procedure was performed on the test bed described. The motion task in this example is to move twenty 0.90 half steps with minimal residual vibration. The desired motion profile is defined by desired position and desired velocity. The desired position and desired velocity are shown by FIGS. 6A and 6B, respectively.

Figure 7A:
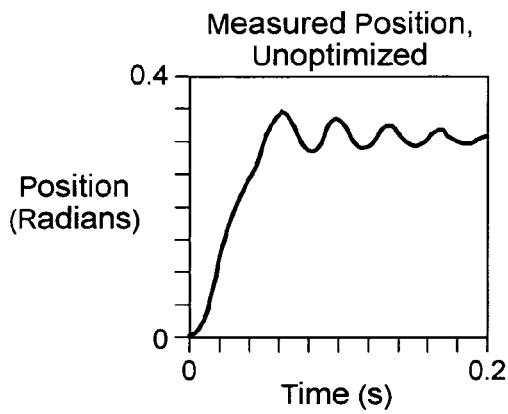
FIGS. 7A & 7B are graphs showing results of an unoptimized test system trying to match the desired profile of FIGS. 6A and 6B.
Figure 7B:
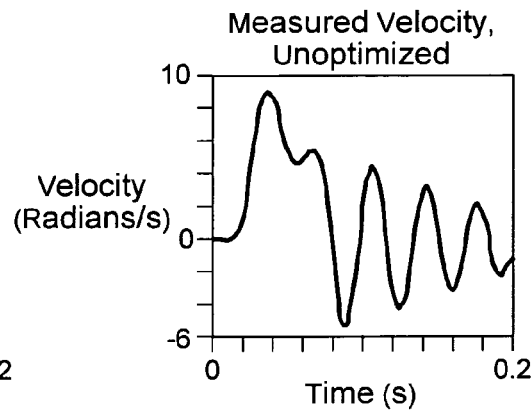

A corresponding step time sequence is generated from the desired trajectory. This is the initial unoptimized step time sequence created by the Traj20.mdl Simulink model, and is listed in the left hand column of the table below. The test bed response to the unoptimized command signal is shown in FIGS. 7A and 7B. Stepper motors are known to exhibit low damping, and this case is no exception: the residual oscillation due to the static torque is plainly apparent in FIGS. 7A and 7B.

The optimization procedure was applied to the system. The following table shows the initial, or unoptimized, and resulting optimized step time sequence values for the system:

| Initial Step Time | Optimized Step Time |
|---|---|
| 0.0020 | 0.0013 |
| 0.0048 | 0.0029 |
| 0.0080 | 0.0063 |
| 0.0108 | 0.0118 |
| 0.0132 | 0.0128 |
| 0.0156 | 0.0138 |
| 0.0180 | 0.0159 |
| 0.204 | 0.0186 |
| 0.0228 | 0.0205 |
| 0.0248 | 0.0225 |
| 0.0268 | 0.0268 |
| 0.0292 | 0.0278 |
| 0.0312 | 0.0288 |
| 0.0336 | 0.0298 |
| 0.0360 | 0.0312 |
| 0.0384 | 0.0358 |
| 0.0412 | 0.0378 |
| 0.0440 | 0.0419 |
| 0.0468 | 0.0456 |
| 0.0496 | 0.0529 |

Figure 8A:
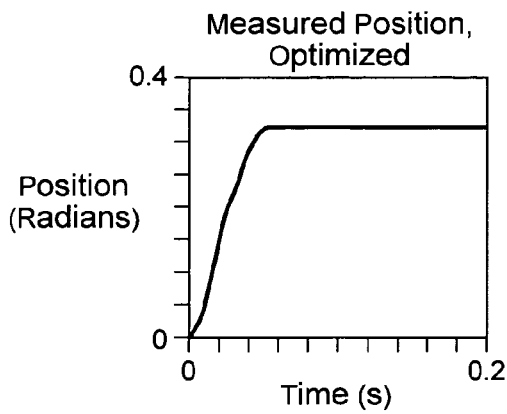
FIGS. 8A & 8B are graphs showing optimized results for the test system seeking the desired profile of FIGS. 6A and 6B.
Figure 8B:
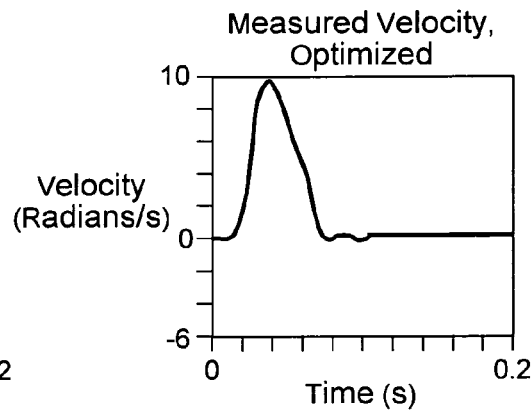

The dramatic reduction in residual oscillation is apparent when comparing the unoptimized case of FIGS. 7A & 7B to the optimized case of FIGS. 8A & 8B.

The direct-on-hardware procedure yields a custom-optimized, machine-specific step state sequence. The goal in this example was to follow the trajectory in both position and velocity, and this is reflected in the objective function. A further goal was to reduce the residual vibration. The objective function addresses both goals because it is based on an integral over the nominal trajectory as well as the time to settle. Thus any residual vibration adds to the objective function value, and the optimization tends to decrease this residual vibration.

Objective functions can be tailored to the requirements of any motion task. For example, the goal of an inkjet printer system might be to maintain constant velocity while the print head is printing. In this case, the ramp up to speed, and the ramp down to stop need not be considered in the objective function.

Research on model-based optimization methods is also underway in addition to the direct optimization method described here. Model-based techniques use simulations rather than hardware measurements to provide feedback to the optimizer. Model-based methods are suitable to the development of systems because the designer can experiment with parameter ranges and gain an understanding of the relationships between, and effects of system parameters.

While a specific embodiment of the invention has been shown and described in detail to illustrate the application of the principles of the invention, it will be understood that the invention may be embodied otherwise without departing from such principles.

What is claimed is:

1. A system for optimizing the performance of a stepper motor by optimizing step-time sequence instructions given to the stepper motor, the system comprising:
  a host computer having a user interface for entering commands to the stepper motor and defining a desired operation profile used to create initial step time sequence instructions; and
  an interface computer connected between the host computer and the stepper motor having program means for executing a real-time controller program which receives real-time feedback from the stepper motor to obtain a measured operation profile for mathematically obtaining an objective function value indicative of a correspondence between the measured and the desired operation profile, and modifying the initial step time sequence instructions to produce optimized step time sequence instructions, so that the measured operation profile is modified to approach the desired operation profile, until the interface computer obtains a low objective function value indicative of an acceptable degree of correspondence between the measured and the desired operation profile, the interface computer transmitting the optimized step-time sequence instructions to the stepper motor.

2. The system of claim 1, further comprising feedback means connected with the stepper motor for providing real-time feedback to the interface computer.

3. The system of claim 1, wherein the optimized step-time sequence instructions are transmitted to the stepper motor in real-time.

4. The system of claim 1, wherein the objective function is modified by the real-time feedback when the real-time controller program executes.

5. An optimization system for a stepper motor, comprising:
  a host computer for entering stepper motor commands defining a desired operation profile;
  an interface computer connected between the host computer and the stepper motor having program means for determining an objective function value, the program means minimizing the objective function value to improve the dynamic performance of the system using a generated step-time sequence based on the desired operation profile, the program means perturbing each time step, and measuring the operation profile and evaluating the objective function value for each perturbation to optimize the system response, wherein the perturbing, measuring and evaluating steps are repeated until the program means obtains a low objective function value indicative of an acceptable degree of correspondence between the measured and the desired operation profile.

6. A method for optimizing operation of a stepper motor based on a desired operation profile, the method comprising:
  providing an interface computer connected with the stepper motor;
  generating an objective function for optimizing a step-time sequence for the stepper motor;
  loading an optimization program including the objective function on the interface computer;
  generating an initial step-time sequence for the stepper motor;
  receiving, at the interface computer, feedback from hardware on the stepper motor, the feedback containing a measured operation profile;

calculating a difference between the desired and measured operation profile;

applying a mathematical operation to the difference to obtain an objective function value; and running the optimization program on the interface computer for determining perturbations to the step-time sequence instructions to minimize an objective function value in response to the feedback to generate an optimized step-time sequence, wherein the receiving, calculating applying and running steps are repeated until the program means obtains a low objective function value indicative of an acceptable degree of correspondence between the measured and the desired operation profile.

7. A method according to claim 6, wherein running of the optimization program includes inputting the objective function value into an algorithm for determining perturbations to the step-time sequence instructions.

8. A method according to claim 6, wherein the steps of receiving a measured operation profile, calculating a difference between the desired and measured operation profile, applying a mathematical operation to the difference to obtain an objective function value, and running the optimization program are repeated, so that the objective function value is minimized and the measured operation profile approaches the desired operation profile.

9. A system for optimizing the performance of a stepper motor by optimizing step-time sequence instructions given to the stepper motor, the system comprising:

a host computer having a user interface for entering commands to the stepper motor and defining a desired operation profile used to create initial step time sequence instructions; and an interface computer connected between the host computer and the stepper motor having program means for executing a real-time controller program which receives real-time feedback from the stepper motor to obtain a measured operation profile for mathematically obtaining an objective function value which is input into an algorithm for determining perturbations to the step-time sequence instructions, wherein the perturbations are repeated until a low objective function value indicative of an acceptable degree of correspondence between the measured and the desired operation profile is obtained, and the real-time controller transmits optimized step time sequence instructions to the motor.

10. A system according to claim 9, wherein the real-time controller program receives real-time feedback from the stepper motor to repeatedly obtain a measured operation profile for mathematically obtaining on a repeated basis an objective function value which is repeatedly input into an algorithm for repeatedly determining perturbations to the step-time sequence instructions, wherein the real-time controller transmits optimized step time sequence instructions to the motor.

* * * * *